United States Patent
Chang et al.

(10) Patent No.: US 10,579,195 B2
(45) Date of Patent: Mar. 3, 2020

(54) OPTICAL-CAPACITIVE SENSOR PANEL DEVICE AND METHOD FOR MANUFACTURING SAME

(71) Applicant: Bidirectional Display, Inc., Acton, MA (US)

(72) Inventors: Hsuan-Yeh Chang, Chestnut Hill, MA (US); Anping Liu, Acton, MA (US)

(73) Assignee: Bidirectional Display, Inc., Acton, MA (US)

( * ) Notice: Subject to any disclaimer, the term of this patent is extended or adjusted under 35 U.S.C. 154(b) by 0 days.

(21) Appl. No.: 15/978,224

(22) Filed: May 14, 2018

(65) Prior Publication Data

US 2018/0260056 A1 Sep. 13, 2018

Related U.S. Application Data

(63) Continuation of application No. 15/282,153, filed on Sep. 30, 2016, now Pat. No. 9,983,753.

(60) Provisional application No. 62/236,125, filed on Oct. 1, 2015.

(51) Int. Cl.
  *G06F 3/044* (2006.01)
  *G06K 9/00* (2006.01)
  *H04N 1/10* (2006.01)

(52) U.S. Cl.
  CPC .......... *G06F 3/044* (2013.01); *G06K 9/0002* (2013.01); *G06K 9/0004* (2013.01); *H04N 1/10* (2013.01); *G06F 2203/04106* (2013.01)

(58) Field of Classification Search
  CPC .......... G06F 3/044; G06F 2203/04106; G06K 9/0004; G06K 9/0002; H04N 1/10
  See application file for complete search history.

(56) References Cited

U.S. PATENT DOCUMENTS

| | | | |
|---|---|---|---|
| 2009/0244026 A1* | 10/2009 | Purdy | G06F 3/042 345/174 |
| 2010/0078230 A1* | 4/2010 | Rosenblatt | G06F 3/041 178/18.01 |
| 2011/0063243 A1* | 3/2011 | Kim | G06F 3/0412 345/174 |
| 2012/0113044 A1 | 5/2012 | Strazisar | |

(Continued)

OTHER PUBLICATIONS

Gian Luca Marcialis, et al., "Fingerprint Verification by Fusion of Optical and Capacitive Sensors," Pattern Recognition Letters, vol. 25, Issue 11, Aug. 2004, pp. 1315-1322.

*Primary Examiner* — Mark W Regn
(74) *Attorney, Agent, or Firm* — Hsuanyeh Law Group, PC

(57) ABSTRACT

The present disclosure provides an optical-capacitive sensor panel device. In one aspect, the panel device includes a transparent substrate having a first surface; an optical sensor array formed on the first surface of the transparent substrate, the optical sensor array including a plurality of photosensitive pixels spaced apart from each other and arranged on the first surface to form a lattice structure; a plurality of row electrodes formed on the optical sensor array and electrically coupled to a first group of the photosensitive pixels; a plurality of column electrodes formed on the optical sensor array crossing the row electrodes and electrically coupled to a second group of the photosensitive pixels; and an insulating layer formed between the row electrodes and the column electrodes.

20 Claims, 12 Drawing Sheets

(56) References Cited

U.S. PATENT DOCUMENTS

| | | | |
|---|---|---|---|
| 2013/0175154 A1* | 7/2013 | Takahashi | G06F 3/044 200/600 |
| 2014/0192007 A1* | 7/2014 | Westhues | G06F 3/044 345/174 |
| 2015/0029157 A1* | 1/2015 | Wang | G06F 3/03547 345/175 |
| 2015/0268754 A1 | 9/2015 | Chang | |
| 2016/0148036 A1* | 5/2016 | Kim | G06K 9/0002 382/124 |

* cited by examiner

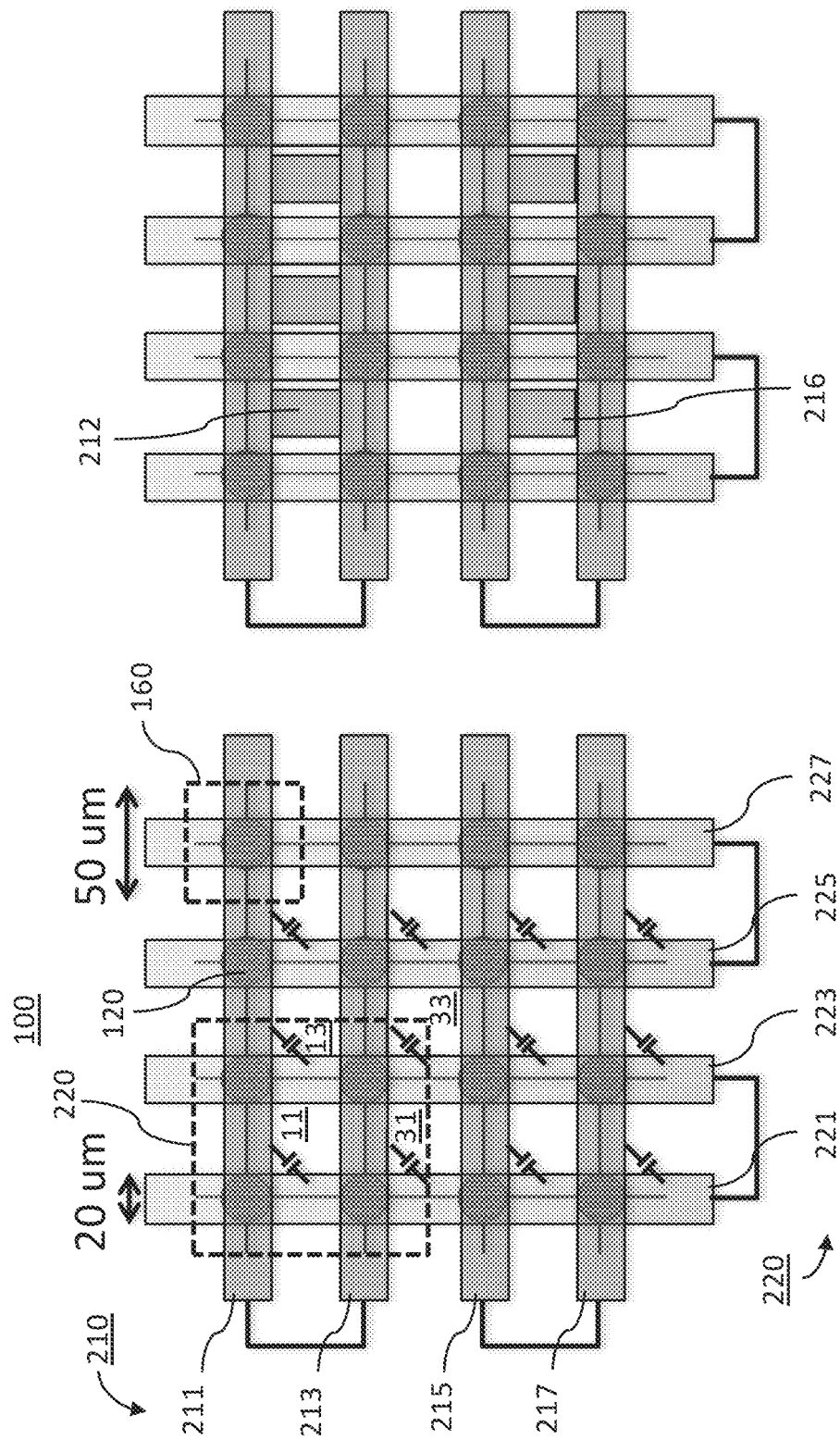

OPTICAL-CAPACITIVE SENSOR PANEL DEVICE AND METHOD FOR MANUFACTURING SAME

RELATED APPLICATION

This is a continuation of U.S. application Ser. No. 15/282,153 filed on Sep. 30, 2016, which claims the benefit of priority to U.S. Provisional Application No. 62/236,125, filed on Oct. 1, 2015, the entire contents of both of which are incorporated herein by reference for all purposes.

Additionally, the present disclosure relates to U.S. patent application Ser. No. 14/690,495, filed on Apr. 20, 2015, issued as U.S. Pat. No. 9,122,349 on Sep. 1, 2015, which is a Continuation of International Application No. PCT/US15/021199, filed on Mar. 18, 2015, which claims priority to U.S. Provisional Application No. 62/025,772, filed on Jul. 17, 2014 and U.S. Provisional Application No. 61/955,223, filed on Mar. 19, 2014, the entire contents of all of which are incorporated herein by reference for all purposes.

TECHNICAL FIELD

The present disclosure relates to an optical-capacitive sensor panel device and a method for manufacturing the sensor panel device. More particularly, the present disclosure relates to a hybrid optical-capacitive sensor panel device including an array of photosensitive pixels and an array of capacitance sensitive pixels, and a method for manufacturing the same.

BACKGROUND

Flat panel displays have been used ubiquitously as a standard output device for various stationary or mobile electronic apparatuses, such as, personal computers, laptop computers, smart phones, smart watches, televisions, hand-held video game devices, public information displays, and the like. Recently, flat panel displays have been developed to include input functionalities (e.g., touch screens that are sensitive to pressure or capacitance changes in response to user interactions), such that the flat panel displays can be used as both an input device and an output device. A touch screen can interact with a user and detect one or more of user's contacts and/or drawings on the screen as input signals. However, a touch screen cannot capture graphical information from a two-dimensional surface of information bearing substrates.

Therefore, there is a need to develop a new sensor panel device that can capture both touch information (from, for example, a human finger, a stylus, etc.) and graphical information (from, for example, a two-dimensional surface of an information bearing substrate). There is also a need to develop new methods for making and driving such a sensor panel device.

BRIEF DESCRIPTION OF THE DRAWINGS

FIGS. 4A and 4B illustrate a top view of an optical-capacitive sensor panel, in accordance with embodiments of the present disclosure.

DETAILED DESCRIPTION

The term "information bearing substrate" (or IBS) is used herein to refer to any tangible medium having a two-dimensional surface that bears textual, graphical, or other information printed or otherwise attached thereto. In various embodiments, the IBS can be a document, a photograph, a drawing, a business card, a credit card, a smartphone display screen, a surface of a merchandize package box, a book cover/page, a finger/palm/foot surface, and the like. Unless otherwise provided, the term "sensor panel" (or SP) is used herein to refer to a sensor panel device that includes an array of photosensitive pixels (or image sensor pixels) and an array of touch-sensitive pixels (or touch sensor pixels) formed on a glass/plastic substrate, as shown and described herein.

Figure 1:
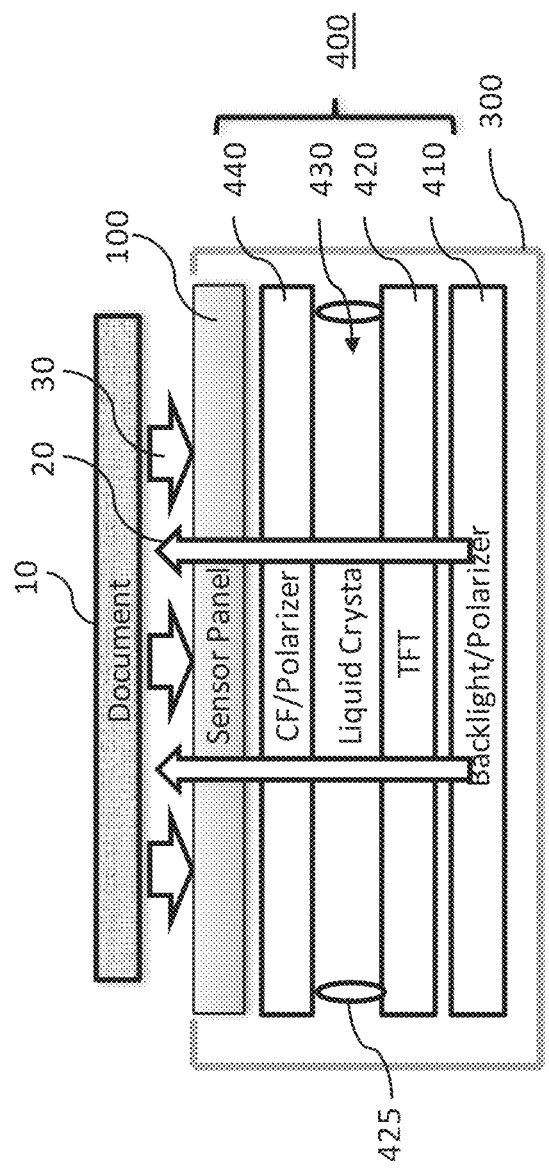
FIG. 1 illustrates a sectional view of an optical-capacitive sensor panel in combination with a flat panel display device (e.g., a liquid crystal display (LCD) module), in accordance with an embodiment of the present disclosure
Figure 3:
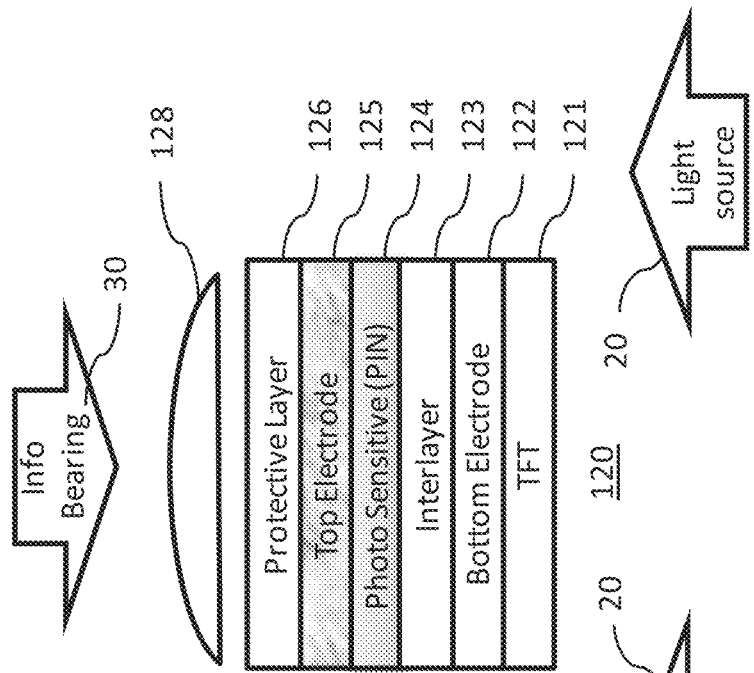
FIG. 3 illustrates a sectional view of a photosensitive pixel, in accordance with an embodiment of the present disclosure.
Figure 2:
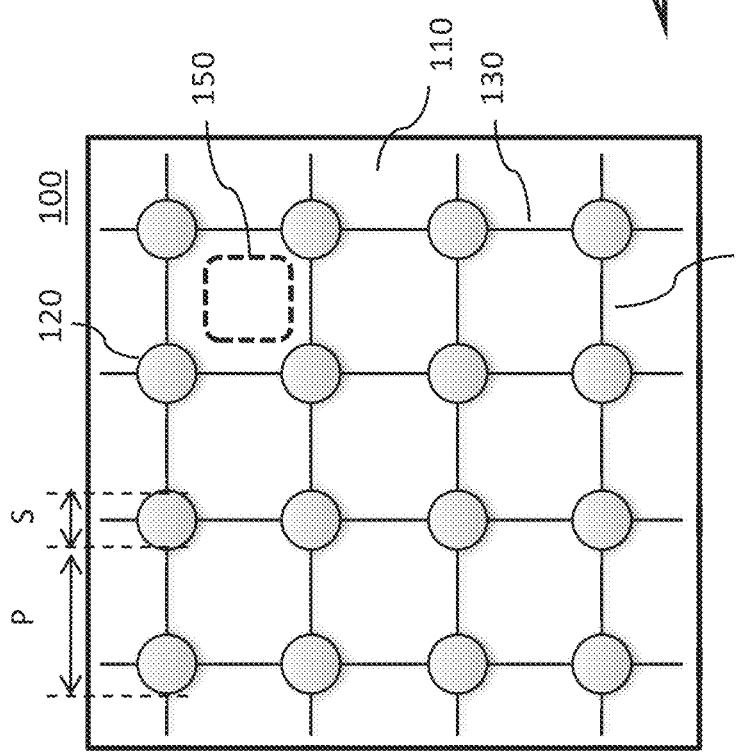
FIG. 2 illustrates a plane view of a sensor panel including an array of photosensitive pixels, in accordance with an embodiment of the present disclosure.

FIG. 1 illustrate a sectional view of a sensor panel 100 in combination with a flat panel display device 400, in accordance with an embodiment of the present disclosure. As shown in FIG. 1, flat panel display device 400 is a liquid crystal display (LCD) module 400. It is appreciated that flat panel display device 400 may be other kinds of flat panel display devices, such as, an organic light emitting diode (OLED) display module, a quantum dot display module, and the like. FIG. 2 illustrates a plane view of a sensor panel 100 including an array of photosensitive pixels 120, in accordance with an embodiment of the present disclosure. It is appreciated that, although not shown in FIG. 2, sensor panel 100 additionally includes a plurality of touch sensor pixels to be described in further detail below. FIG. 3 illustrates a sectional view of a photosensitive pixel 120, in accordance with an embodiment of the present disclosure.

Referring to FIGS. 1 through 3, display device 400 includes a backlight module 410 configured to emit a planar light source 20 of, for example, white color. Backlight module 410 may additionally include a first polarizer so as to make planar light source 20 linearly polarized along a first polarization direction. Display device 400 further includes a thin-film-transistor (TFT) backplane 420 disposed on backlight module 410, a liquid crystal material 430 on TFT backplane 420, and a color filter layer 440 on liquid crystal material 430. The liquid crystal material 430 is enclosed between TFT backplane 420 and color filter layer 440 by sealant 425. TFT backplane 420 includes display pixel electrodes to control the rotation orientation of liquid crystal material 430, so as to rotate the polarization direction of planar light source 20 at different pixel locations by applying a voltage signal thereto. Color filter 440 includes an array of color pixels (e.g., red, green, and blue) separated by a black matrix, each color pixel corresponding and aligning to a display pixel electrode of TFT backplane 420, so as to generate colored output for display device 400. Color filter 440 may additionally include a second polarizer having a second polarization direction perpendicular to the first polarization direction of the first polarizer of backlight module 410.

As shown in FIG. 1, a sensor panel (SP) 100 is disposed on or above color filter 440 and is enclosed in a housing 300 together with display device 400. It is appreciated that, in certain embodiments, SP 100 can be formed and integrated with color filter 440. An upper surface of SP 100 is optically exposed to the exterior of housing 300 so as to allow light source 20 to penetrate therethrough. SP 100 includes a plurality of photosensitive pixels separated from each other to leave optically transparent regions. In one embodiment, the photosensitive pixels of SP 100 are aligned with the black matrix of color filter 440 so as not to interfere with the display quality. In one embodiment, SP 100 additionally include capacitance sensitive pixels integrated with the photosensitive pixels as detailed below.

FIG. 2 illustrates a plane view of a sensor panel (SP) 100, in accordance with an embodiment of the present disclosure. SP 100 includes a transparent substrate 110, an array of photosensitive pixels 120, and a plurality of column conductive lines (columns) 130 and row conductive lines (rows) 140 electrically coupled with photosensitive pixels 120. SP 100 also includes a plurality of touch sensor pixels (not shown) which will be described in further detail below. Photosensitive pixels 120 may be formed proximate intersections of columns 130 and rows 140. In certain embodiments, photosensitive pixels 120 can be arranged on a first region of substrate 110 to form a square lattice structure, a rectangular lattice structure, a triangular lattice structure, a hexagonal lattice structure, and the like. Each of photosensitive pixels 120 can be configured to have, for example, a circular shape, an oval shape, a square shape, a rectangular shape having rounded corners, or any other suitable shapes. In one embodiment, the first region of substrate 110 is rendered optically opaque or non-transparent due to the presence of photosensitive pixels 120. In one embodiment, ISP 100 is devoid of light emitting elements and optically transparent at non-photosensitive pixel regions (i.e., other than the first region).

In the embodiment of a square lattice structure (upright or diagonal), each photosensitive pixel may have a photosensitive pixel size S (e.g., a width or diameter, depending on the pixel shape, of about 10-40 um) and two neighboring photosensitive pixels may be separated by a pixel separation distance P. Pixel separation distance P may be about 1.5 to 5 times of pixel size S. For example, pixel size S may be 20 um, while pixel separation may be 30 um (P=1.5 S), 40 um (P=2 S), or 50 um (P=2.5 S). Photosensitive pixels 120 are separated so as to leave transparent regions 150 (i.e., the non-sensor pixel regions) to allow at least a portion of the surface light source from backlight module 410 to penetrate therethrough.

FIG. 3 illustrates a sectional view of a photosensitive pixel 120 of sensor panel 100 as illustrated in FIG. 2. Referring to FIG. 3, photosensitive pixel 120 may be formed on a control element 121 (e.g., one or more TFTs) and include a bottom electrode 122 on control element 121, an interlayer 123 on bottom electrode 122, a photosensitive layer 124 on interlayer 123, a top electrode 125 on photosensitive layer 124, and a protective layer 126 (optional) on top electrode 125. In this embodiment, top electrode 125 serves as a common electrode which is electrically connected to the ground when photosensitive pixel 120 is configured to detect light signals. Two terminals of control element 121 are electrically coupled to a column and a row, respectively. Photosensitive pixel 120 may additionally include a microlens 128 configured to concentrate light signals incident from exterior of display device 400 to photosensitive layer 124. In one embodiment, microlens 128 may have a lens thickness of about 5-50 um, a lens diameter of about 10-250 um (or comparable to photosensitive pixel size S or pixel separation distance P), and a focal length of about 50-1,000 um.

Photosensitive layer 124 may comprise semiconductor materials, e.g., amorphous silicon (a-Si), low temperature polysilicon (LTPS), metal oxide (ZnO, IGZO, etc.), and the like, which form a PIN structure. Alternatively, photosensitive layer 124 may comprise organic photosensitive materials, carbon nanotube or fullerene based photosensitive materials, or the like. Interlayer 123 is optional and may comprise PEDOT:PSS. Protective layer 126 is optional and may comprise a transparent laminating material or alternatively a non-transparent or opaque resin material so as to form a light block.

Referring to FIGS. 1 through 3, in operation, an information bearing substrate (IBS) 10, such as a document, can be placed on SP 100 with the information bearing surface contacting an upper surface of SP 100. In one embodiment, due to a thickness of glass substrate 110, a cover glass (not shown), or otherwise, between IBS 10 and photosensitive pixels 120, planar light source from backlight module 410 can penetrate through transparent region 150, bypassing photosensitive pixels 120, reaching IBS 10, and thereafter being reflected from IBS 10 to form reflected light 30. Photosensitive pixels of SP 100 can then detect reflected light from IBS 10, thereby capturing textual or graphical information attached to the information bearing surface of IBS 10. In one embodiment, reflected light 30 may be concentrated by microlens 128.

Referring to FIGS. 1 through 3, in operation, an information bearing substrate (IBS) 10, such as a document, can be placed on SP 100 with the information bearing surface contacting an upper surface of SP 100. In one embodiment, due to a thickness of glass substrate 110, a cover glass (not shown), or otherwise, between IBS 10 and photosensitive pixels 120, planar light source 20 can penetrate through transparent region 150, bypassing photosensitive pixels 120, reaching IBS 10, and thereafter being reflected from IBS 10 to form reflected light 30. Photosensitive pixels of SP 100 can then detect reflected light 30 from IBS 10, thereby capturing textual or graphical information attached to the information bearing surface of IBS 10. In one embodiment, reflected light 30 may be concentrated by microlens 128.

In one embodiment, a light source (e.g., a uniform surface light source from backlight module 410) can emit along a first direction 20 to an information bearing substrate (IBS) 10 bypassing photosensitive pixels 120 and through non-photosensitive pixel regions 150. In one embodiment, backlight module 410 may be a planar OLED lamp, which may be flat or curved. The light source is then reflected from IBS 10, carrying information from IBS 10 and entering into photosensitive pixels 120 along a second direction 30. In one embodiment, darker markings on IBS 10 reflect less light (lower intensity), while brighter markings on IBS 10 reflect more light (higher intensity). In response to the reflected light, photosensitive layer 124 detects the information carried by the reflected light (e.g., intensity of the reflected light) and generates electrons, thereby forming a photo current that flows vertically and is detected or read using column 130 and row 140. In this embodiment, top electrode 125 and protective layer 126 may comprise an optically transparent material, while control element 121 and/or bottom electrode 122 may comprise optically non-transparent materials, thereby acting as a light block.

It is appreciated that, in an alternative embodiment, first direction 20 of light source and second direction 30 of reflected light may be opposite to those illustrated in FIG. 3. As such, in the alternative embodiment, top electrode 125 and protective layer 126 may comprise optically non-transparent (or opaque) materials, thereby acting as a light block, while bottom electrode 122 and/or TFT layer 121 may comprise an optically transparent material.

FIGS. 4A and 4B illustrate a top view of an optical-capacitive sensor panel 100, in accordance with embodiments of the present disclosure. Referring to FIG. 4A, sensor panel 100 includes an array of photosensitive pixels 120 arranged in an upright square lattice structure. Each photosensitive pixel 120 may have an effective image sensor pixel 160 which defines an image sensor resolution. Photosensitive pixel 120 may have a diameter of about 20 um, while effective image sensor pixel 160 may have side lengths of about 50 um, thereby defining an image sensor resolution of about 508 pixels-per-inch (ppi).

Referring again to FIG. 4A, a plurality of X electrodes 211, 213, 215, and 217 (or collectively 210) (each having a shape of horizontal rectangular stripes) and a plurality of Y electrodes 221, 223, 225, and 227 (or collectively 220) (each having a shape of vertical rectangular stripes) are formed on the array of photosensitive pixels 120. Although only four X electrodes and four Y electrodes are shown and described, it is appreciated that more than thousands of X and Y electrodes can be formed on sensor panel 100. In one embodiment, X electrodes 211, 213, 215, and 217 and Y electrodes 221, 223, 225, and 227 comprise a metallic material that is optically transparent (e.g., ITO).

In one embodiment, X electrodes 211, 213, 215, and 217 are formed on photosensitive pixels 120 and electrically coupled to top electrode 125 of photosensitive pixels 120, while Y electrodes 221, 223, 225, and 227 are formed on photosensitive pixels 120 and electrically insulated with X electrodes 211, 213, 215, and 217 by a low-k dielectric layer 230 (see, e.g., FIGS. 6C and 6D) formed between X electrodes 211, 213, 215, and 217, and Y electrodes 221, 223, 225, and 227. In image sensor mode, all of X electrodes 211, 213, 215, and 217 are electrically coupled to the ground (i.e., zero voltage), thereby serving together as the common electrode for all photosensitive pixels 120. In touch sensor mode, X electrodes 211, 213, 215, and 217 are electrically coupled in separate groups, each group being read independently to identify finger touches.

It is appreciated that, in certain embodiments, X and Y electrodes do not need to be electrically coupled into electrode groups. In such cases, X and Y electrodes can form capacitive touch pixels having a touch resolution as high as the image sensor resolution. For example, both capacitive touch resolution and image sensor resolution can both be 508 ppi or greater. Such high resolutions for both capacitive pixels and photosensitive pixels can be advantageous in biometrics applications, such as, when reading fingerprints from dirty fingers.

In general, the resolution of touch sensor pixels is much lower than that of image sensor pixels. Accordingly, multiple neighboring X and/or Y electrodes can be electrically coupled with each other to maintain at the same electrical potential or voltage at all times. As a result, a group of electrically coupled X electrodes and a group of electrically coupled Y electrodes define a touch sensor pixel. As shown in FIG. 4A, in this embodiment, X electrodes 211 and 213 are electrically coupled to form a first group of X electrodes having the same voltage at all times, while X electrodes 215 and 217 are electrically coupled to form a second group of X electrodes having the same voltage at all times. Likewise, in this embodiment, Y electrodes 221 and 223 are electrically coupled to form a first group of Y electrodes having the same voltage at all times, while Y electrodes 225 and 227 are electrically coupled to form a second group of Y electrodes having the same voltage at all times. As a result, in this embodiment, effective capacitive touch pixels 250 are formed, each having an effective area of about 100×100 um$^2$. As shown in FIG. 4A, X and Y electrodes are grouped and electrically coupled from one end of the electrodes. It is appreciated that X and Y electrodes can be electrically coupled from the other end or from both ends of the electrodes.

It is appreciated that, in certain embodiments, the X and Y electrodes can be used to achieve the wake-on-touch function. That is, when a finger contacts an upper surface of optical-capacitive sensor panel 100 to have its fingerprint taken, the X and Y electrodes in a capacitive touch mode can be used to detect the presence of such finger. Upon detection of the finger presence, optical-capacitive sensor panel 100 is switched to the image sensing mode to capture a fingerprint using the underlying photosensitive pixels 120.

In one embodiment, all X electrodes can be electrically coupled together, while all Y electrodes can be electrically coupled together and insulated from all X electrodes. In such cases, the X and Y electrodes effectively form a single sensing capacitor or capacitive touch pixel to achieve the wake-on-touch function. A single X or Y electrode "layer" can be used in place of the X or Y electrode "stripes" so as to serve the same function as all the X or Y electrodes being electrically coupled together. One of the X and Y electrode layers can be a common electrode (i.e., connected to the ground), while the other of the X and Y electrode layers can be a detection electrode connected to a readout circuit for detecting a touch event in response to a capacitance chance due to the presence of a conductive object, e.g., a finger.

As shown in FIG. 4A, in this embodiment, effective capacitive touch pixel 250 includes four mini capacitors 11, 13, 31, 33 electrically coupled to each other in parallel. It is appreciated that, depending on design choices, effective capacitive touch pixels 250 can be formed by electrically coupling any suitable number (e.g., 10, 50, and 100) of X electrodes and any suitable number (e.g., 10, 50, and 100) of Y electrodes to form a suitable number of mini capacitors electrically coupled in parallel. Each effective pixel has a capacitance that can be approximated as $Cpix=M*N*\varepsilon*A/d$, where M denotes the number of row lines or X electrodes in each effective pixel, N denotes the number of column lines or Y electrodes each effective pixel, A denotes an overlap area of each mini capacitor, D denotes the thickness of dielectric layer 230, and $\varepsilon$ denotes the dielectric constant of dielectric layer 230.

In one embodiment, touch sensor pixels 250 can have a touch resolution of about 10 ppi. In such a case, 50 X electrodes can be electrically coupled together, while 50 Y electrodes can be electrically coupled together to form including 2,500 mini capacitors. As such, an effective capacitive touch pixel is formed having an effective area of about 2.5×2.5 mm². When a conductive object, e.g., a human finger, is placed in touch with or in proximity to an effective capacitive touch pixel, the conductive object changes the capacitance value at the effective capacitive touch pixel. Accordingly, touches of the conductive object on sensor panel 100 can be detected with locations of the touches being identified in accordance with the capacitance change.

Referring now to FIG. 4B, there is illustrated a sensor panel 100' in accordance with another embodiment of the present disclosure. Sensor panel 100' of FIG. 4B is substantially the same as sensor panel 100 of FIG. 4A, except that the first group of X electrodes 211 and 213 of sensor panel 100' are electrically coupled by a plurality of (optional) interconnecting electrodes 212, while the second group of X electrodes 215 and 217 of sensor panel 100' are electrically coupled by a plurality of (optional) interconnecting electrodes 216. As discussed above, X electrodes 211, 213, 215, and 217 are electrically coupled to photosensitive pixels 120, which may result in an effective resistance (individually or collectively) greater than that of Y electrodes 221, 223, 225, and 227. Accordingly, as shown in FIG. 4B, interconnecting electrodes 212 and 216 may be formed between gaps of Y electrodes 221, 223, 225, and 227 so as to prevent additional capacitance from being created, yet reducing the resistance of the first and second groups of X electrodes to match with the resistance of the first and second groups of Y electrodes. In certain embodiments, tens or hundreds of X or Y electrodes may be electrically coupled and grouped together. It is appreciated that, in such embodiments, interconnecting electrodes may be used sparingly to form electrical couplings between X electrodes only at a limited number of places selected in any suitable way.

Figure 5:
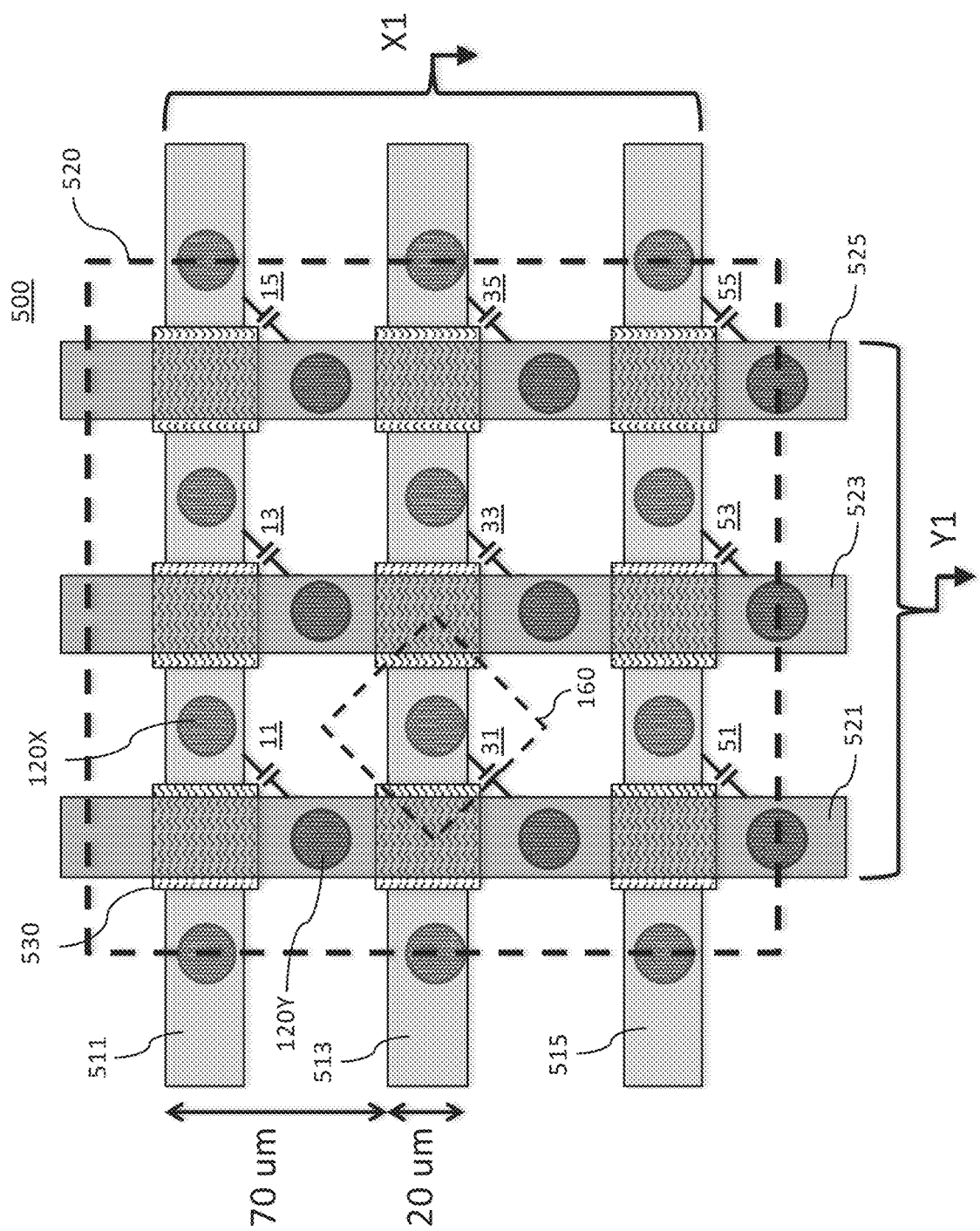
FIG. 5 illustrates a top view of an optical-capacitive sensor panel, in accordance with another embodiment of the present disclosure.

FIG. 5 illustrates a top view of an optical-capacitive sensor panel 500, in accordance with another embodiment of the present disclosure. As shown in FIG. 5, sensor panel 500 includes an array of photosensitive pixels 120 arranged in a diagonal square lattice structure. Each photosensitive pixel 120 may have an effective image sensor pixel 160 having a diamond shape, which defines an image sensor resolution. Photosensitive pixel 120 may have a diameter of about 20 um, while effective image sensor pixel 160 may have side lengths of about 50 um, thereby defining an image sensor resolution of about 508 ppi.

Referring again to FIG. 5, a plurality of X electrodes 511, 513, and 515 (each having a shape of horizontal rectangular stripe) and a plurality of Y electrodes 521, 523, and 525 (each having a shape of vertical rectangular stripe) are formed on photosensitive pixels 120. In this embodiment, X electrodes 511, 513, and 515 are electrically coupled together to form a first electrode group X1 having the same voltage at all times, while Y electrodes 521, 523, and 525 are electrically coupled together to form a second electrode group Y1 having the same voltage at all times. Although only three X electrodes and three Y electrodes are shown and described, depending on design choices, it is appreciated that more than thousands of X and Y electrodes can be formed on sensor panel 100 and more than three X or Y electrodes can be electrically coupled together in a group. In one embodiment, X electrodes 511, 513, and 515 and Y electrodes 521, 523, and 525 comprise a metallic material that is optically transparent (e.g., ITO).

In this embodiment, photosensitive pixels 120 are divided into two categories. A first category of photosensitive pixels 120X is electrically coupled to X electrodes 511, 513, and 515, while a second category of photosensitive pixels 120Y is electrically coupled to Y electrodes 521, 523, 525. First and second categories of photosensitive pixels 120X and 120Y constitute an entire array of photosensitive pixels 120 formed on sensor panel 500. In image sensor mode, all of X and Y electrodes 511, 513, 515, 521, 523, and 525 are electrically coupled to the ground (i.e., zero voltage), thereby serving as the common electrode for all photosensitive pixels 120. It is appreciated that, in alternative embodiments, an additional common electrode may be formed to electrically couple the top electrode 125 of all photosensitive pixels 120 to the ground.

As shown in FIG. 5, X and Y electrodes 511, 513, 515, 521, 523, and 525 are formed on sensor panel 500 crossing each other at locations other than the photosensitive pixels 120X and 120Y. In one embodiment, a plurality of low-k dielectric pads 530 may be formed between X electrodes 511, 513, and 515 and Y electrodes 521, 523, and 525 at their crossing locations, thereby forming a plurality of mini capacitors 11, 13, 15, 31, 33, 35, 51, 53, and 55 electrically coupled in parallel. In one embodiment, dielectric pads 530 may comprise a low-k dielectric material that is optically transparent. Each dielectric pad 530 has a planar area at the crossing areas of respective X and Y electrodes so as to prevent short circuits between the electrodes. The planar area of each pad may be any suitable size for preventing short circuits, for example, substantially greater than the crossing area.

In this embodiment, sensor panel 500 includes effective touch sensor pixels 520, each having an area of about 210×210 um² with nine mini capacitors. As a result, sensor panel 500 has a touch resolution of about 120 ppi. It is appreciated that more than three X electrodes can be electrically coupled and more than three Y electrodes can be electrically coupled to form larger effective touch sensor pixels 520 with a lower touch resolution.

Figure 6B:
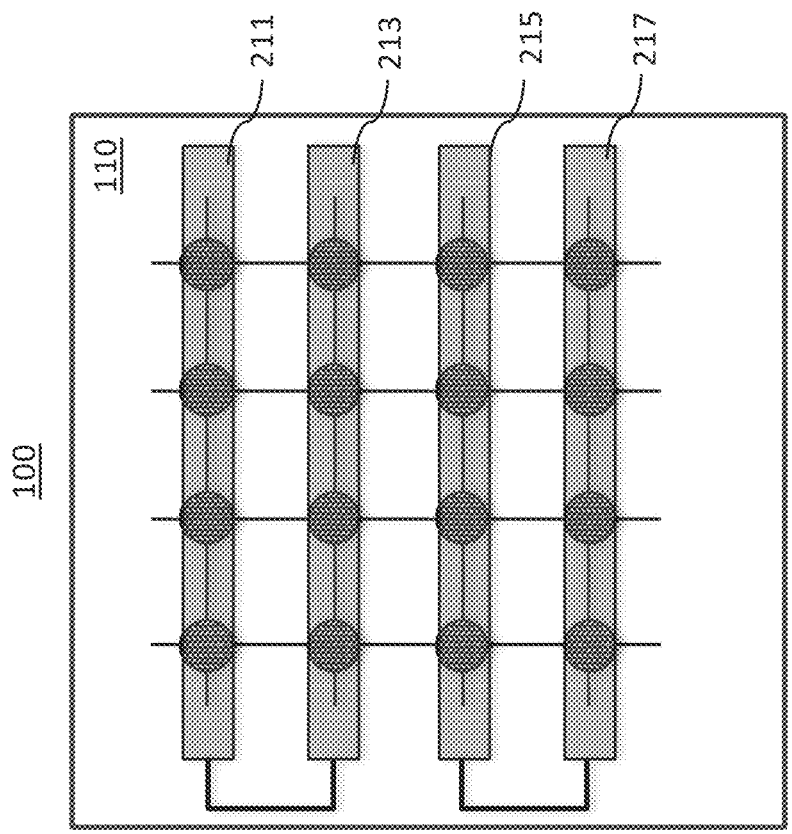
FIGS. 6A through 6D illustrate a process for making an optical-capacitive sensor panel, in accordance with an embodiment of the present disclosure.
Figure 6A:
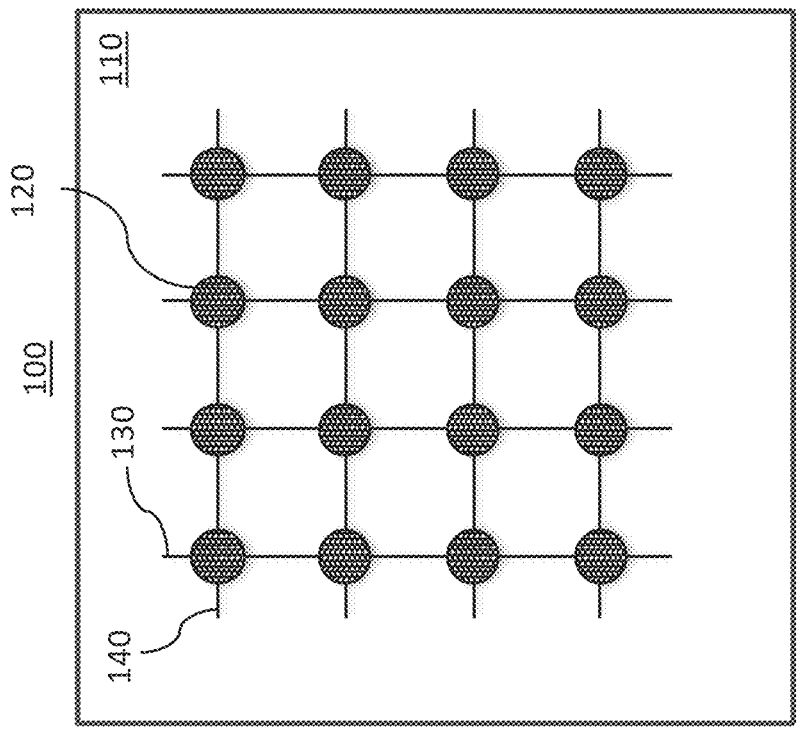

FIGS. 6A through 6D illustrate a process for manufacturing an optical-capacitive sensor panel 100, in accordance with an embodiment of the present disclosure. Referring to FIG. 6A, a transparent substrate 110 is provided including an array of photosensitive pixels 120 and a plurality of columns 130 and rows 140 formed thereon, columns 130 and rows 140 crossing each other and electrically coupled to a respective one of photosensitive pixels 120 proximate the crossings. Transparent substrate 110 may comprise a rigid material (e.g., glass, hard plastic, etc.) or a flexible material (e.g., flexible plastic, metal foil, etc.). In one embodiment, a transparent dielectric layer (not shown) may be formed on substrate 110 to cover columns 130 and rows 140 and expose photosensitive pixels 120 for further processing.

Referring to FIG. 6B, rectangular electrode stripes (or X electrodes) 211, 213, 215, and 217 are formed over transparent substrate 110. Each of electrode stripes 211, 213, and 215 are electrically coupled to a plurality of photosensitive pixels 120. In one embodiment, electrode stripes 211, 213, 215, and 217 may be formed by first depositing a layer of metallic material over the entire substrate 110 and subsequently etching and patterning the metallic material to remove unwanted portions. In one embodiment, after the etching and patterning process, electrode stripes 211 and 213 may remain electrically coupled to form a first electrode group, while electrode stripes 215 and 217 may remain electrically coupled to form a second electrode group. In alternative embodiments, electrode stripes 211, 213, 215, and 217 may be electrically insulated after the etching and patterning process and then electrically coupled in a desired manner using switches external to the sensor panel 100.

Figure 6D:
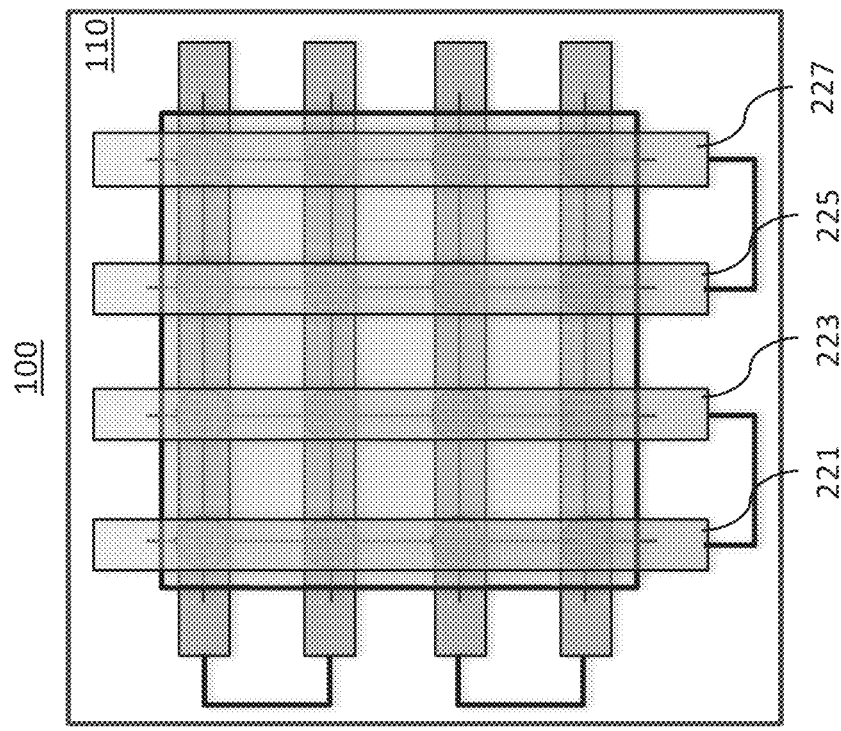
Figure 6C:
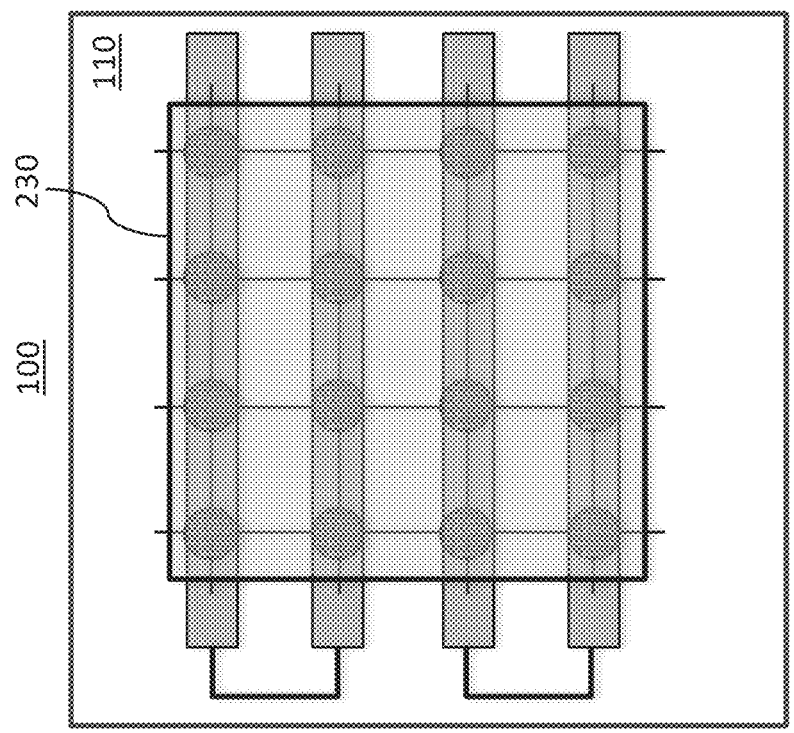

Referring to FIG. 6C, a dielectric layer 230 is deposited over transparent substrate 110 to cover electrode stripes 211, 213, 215, and 217. Dielectric layer 230 may comprise silicon dioxide ($SiO_2$) or a low-k dielectric material. In alternative embodiments, dielectric layer 230 may be patterned into dielectric pads which only cover an area corresponding to photosensitive pixels 120.

Referring to FIG. 6D, rectangular electrode stripes (or Y electrodes) 221, 223, 225, and 227 are formed on dielectric layer 230 crossing conductive stripes 211, 213, 215, and 217 at locations corresponding to that of photosensitive pixels 120. In one embodiment, electrode stripes 221, 223, 225, and 227 may be formed by first depositing a layer of metallic material over dielectric layer 230 and subsequently etching and patterning the metallic material to remove unwanted portions. In one embodiment, after the etching and patterning process, electrode stripes 221 and 223 may remain electrically coupled to form a first electrode group, while electrode stripes 225 and 227 may remain electrically coupled to form a second electrode group. In alternative embodiments, electrode stripes 221, 223, 225, and 227 may be electrically insulated after the etching and patterning process and then electrically coupled in a desired manner using switches external to sensor panel 100.

Figure 7A:
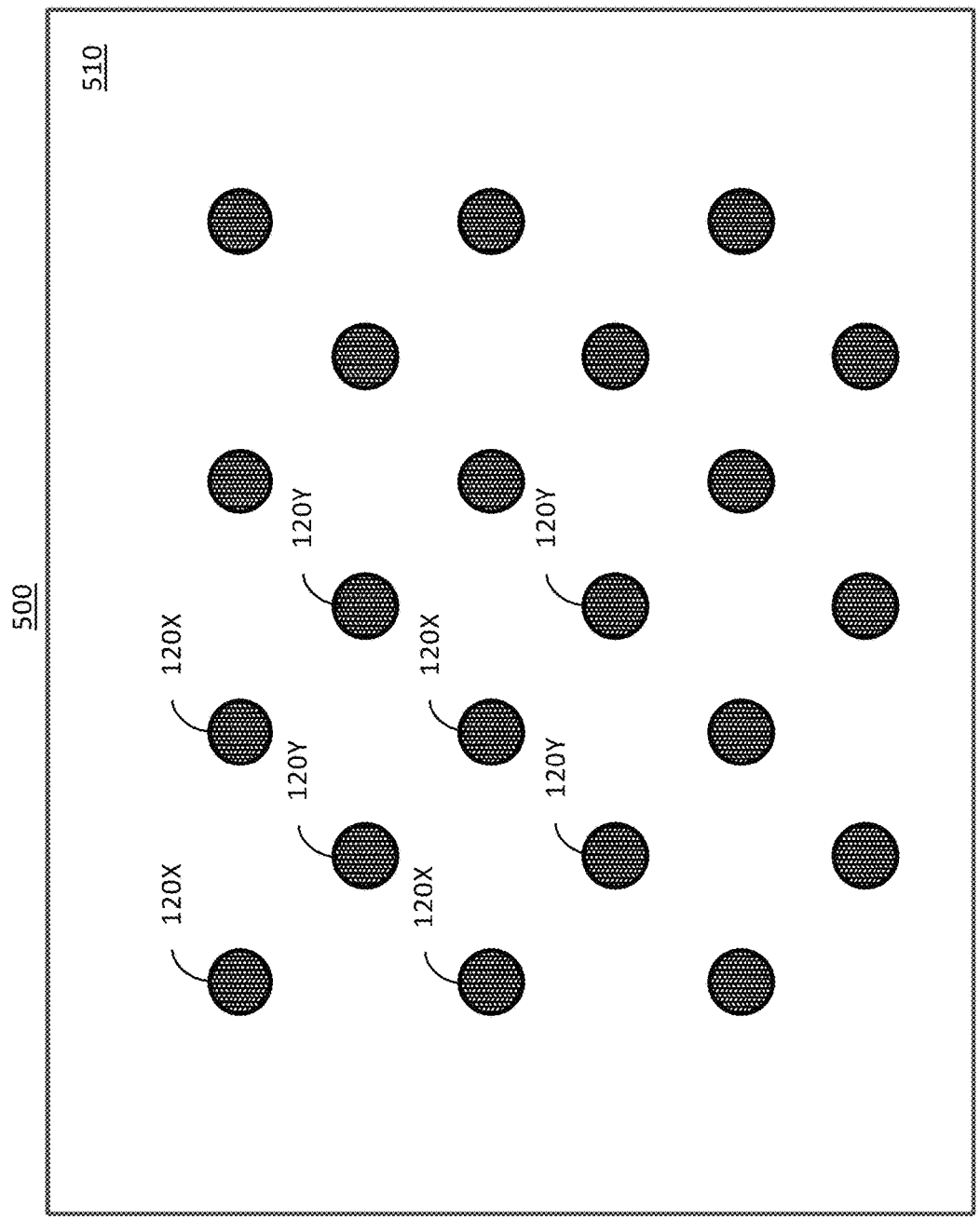
FIGS. 7A through 7D illustrate a process for making an optical-capacitive sensor panel, in accordance with another embodiment of the present disclosure.

FIGS. 7A through 7D illustrate a process for making an optical-capacitive sensor panel 500, in accordance with another embodiment of the present disclosure. Referring to FIG. 7A, a transparent substrate 510 is provided including an array of photosensitive pixels 120 formed thereon and electrically exposed for further processing. In this embodiment, photosensitive pixels 120 are arranged in a diagonal square lattice structure and are divided into a first photosensitive pixel group 120X and a second photosensitive pixel group 120Y. As shown in FIG. 7A, pixels in the first photosensitive pixel group 120X form an upright square lattice, while pixels in the second photosensitive pixel group 120Y also form an upright square lattice. One photosensitive pixel in the first photosensitive pixel group 120X is disposed neighboring four photosensitive pixels in the second photosensitive pixel group 120Y, and vice versa. That is, one pixel in the first or second photosensitive pixel groups 120X or 120Y is disposed at a central location of a unit cell formed by four pixels in the second or first photosensitive pixel groups 120Y or 120X.

Figure 7B:
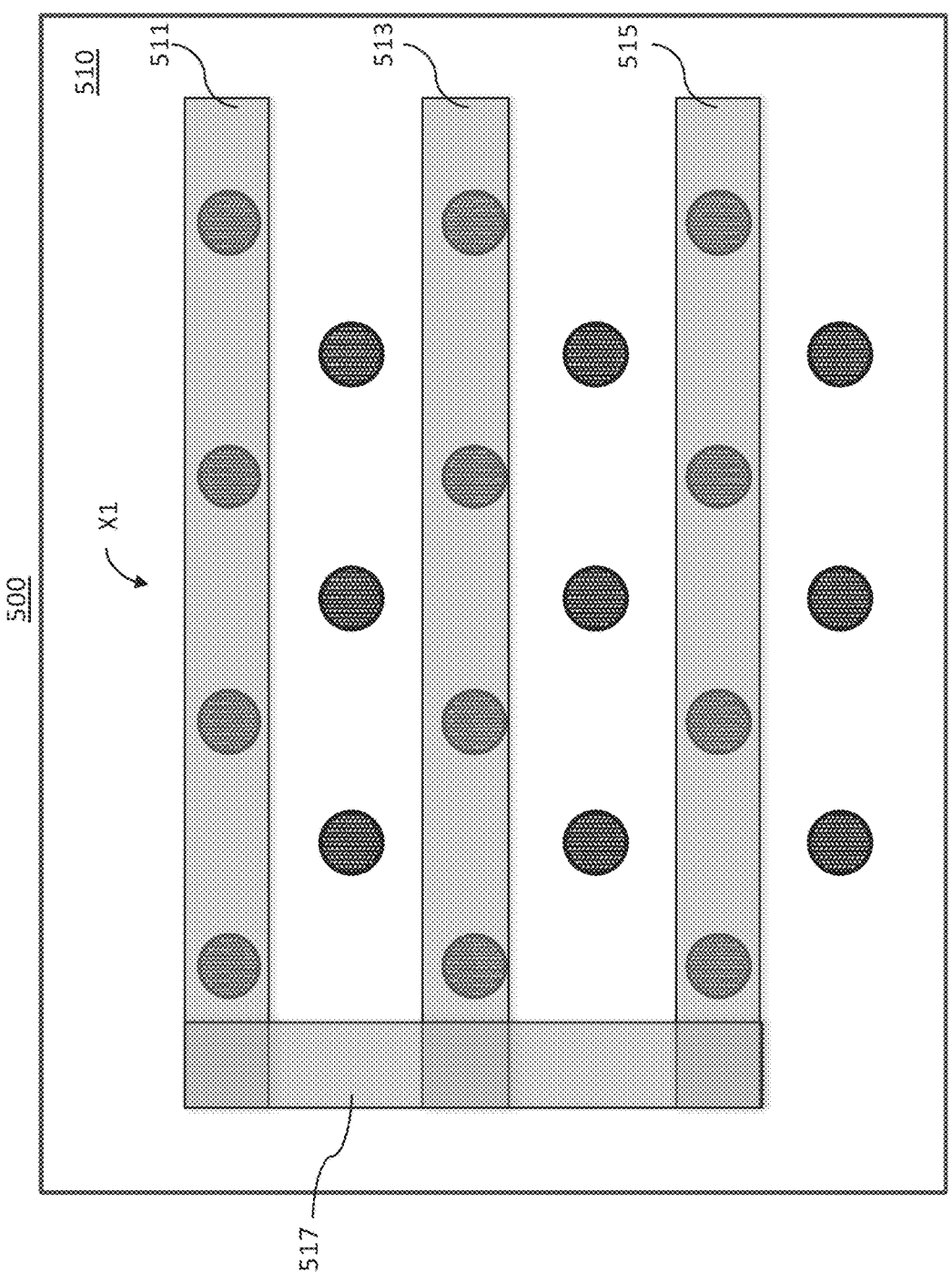

Referring to FIG. 7B, a plurality of X electrodes 511, 513, and 515 (each having a shape of horizontal rectangular stripe) are formed over transparent substrate 510, electrically coupling pixels in the first photosensitive pixel group 120X. In one embodiment, X electrodes 511, 513, and 515 can be electrically coupled with each other through electrode 517 to form first electrode group X1. In one embodiment, first electrode group X1 may be formed by first depositing a layer of metallic material over the entire substrate 110 and subsequently etching and patterning the metallic material to remove unwanted portions.

Figure 7C:
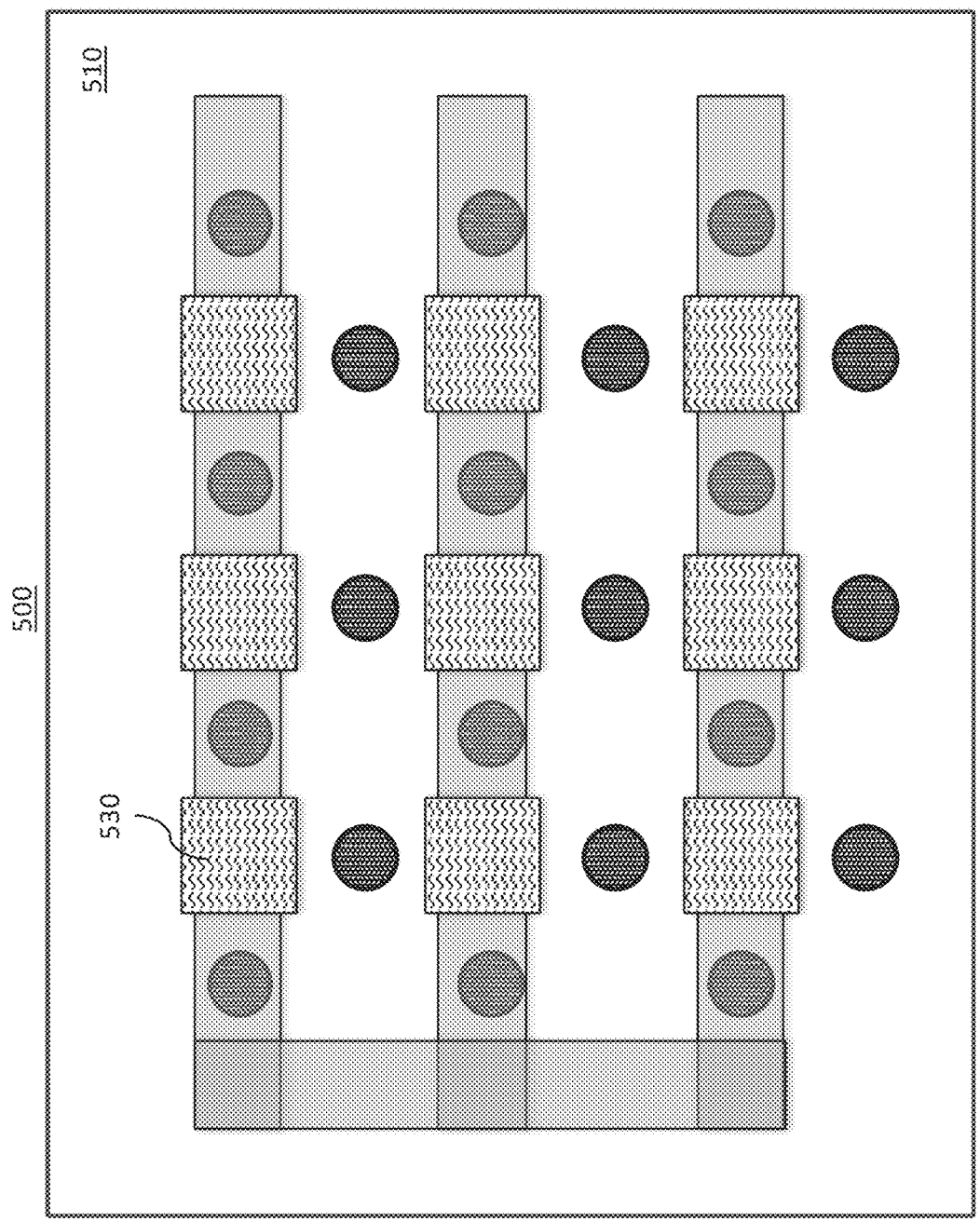

Referring to FIG. 7C, a plurality of dielectric pads 530 is formed on first electrode group X1 and at locations between neighboring pixels in first photosensitive pixel group 120X and neighboring pixels in second photosensitive pixel group 120Y. In one embodiment, dielectric pads 530 may be formed by first depositing a layer of low-k dielectric material over the entire transparent substrate 510 covering first electrode group X1 and second photosensitive pixel group 120Y, and subsequently etching and patterning the low-k dielectric material to remove unwanted portions. In one embodiment, dielectric pads 530 are not yet formed after the etching and patterning step. Instead, at this point, the low-k dielectric material is patterned and etched only to expose second photosensitive pixel group 120Y without exposing any portion of first electrode group X1. It is appreciated that dielectric pads 530, as shown in FIG. 7C, may be formed together with Y electrodes 521, 523, and 525 in a subsequent step described hereafter.

Figure 7D:
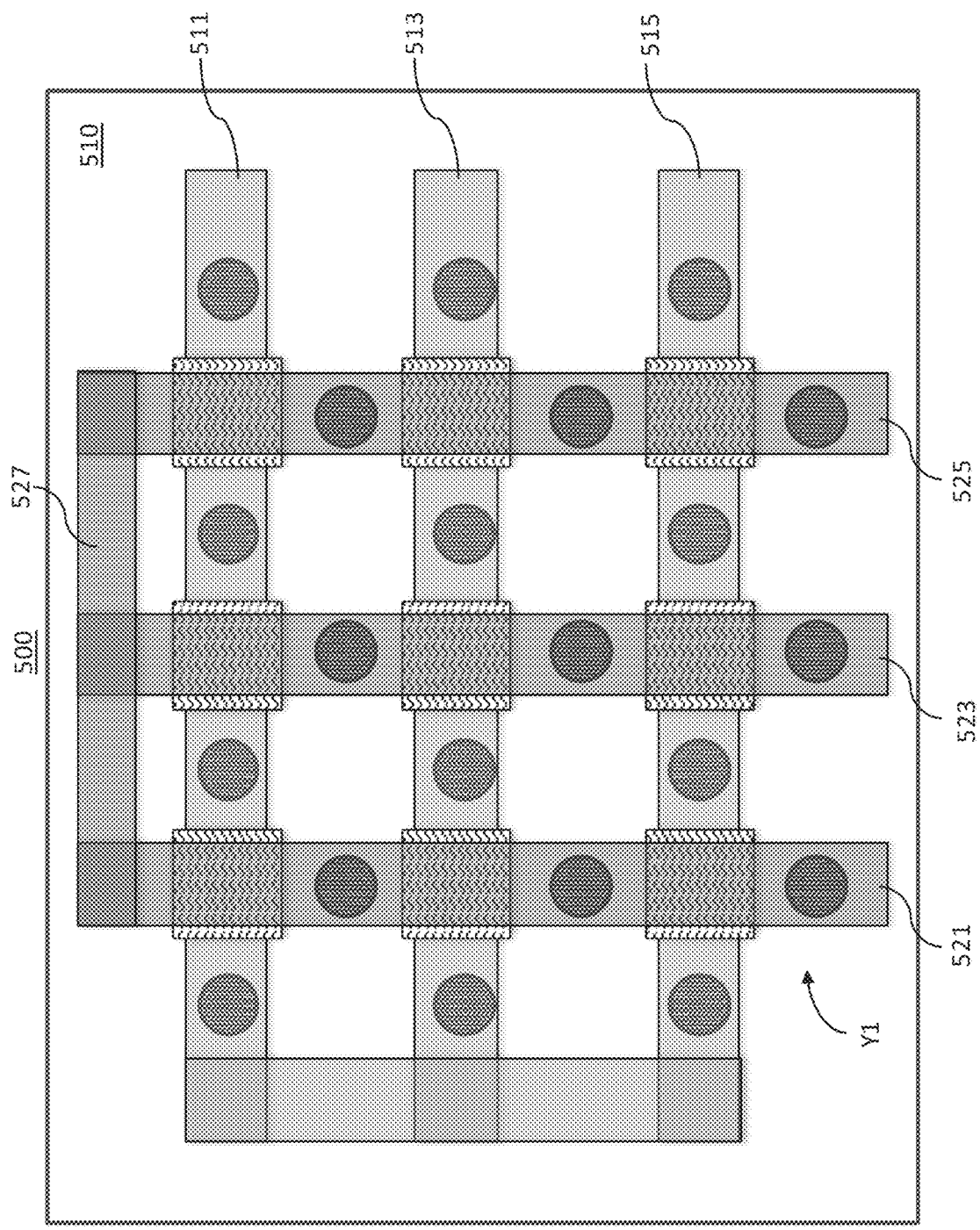

Referring to FIG. 7D, a plurality of Y electrodes 521, 523, and 525 (each having a shape of vertical rectangular stripe) are formed over transparent substrate 510 over dielectric pads 530, electrically coupling pixels in the second photosensitive pixel group 120Y. In one embodiment, Y electrodes 521, 523, and 525 can be electrically coupled with each other through electrode 527 to form second electrode group Y1. In one embodiment, second electrode group Y1 may be formed by first depositing a layer of metallic material over the entire substrate 110 covering the previously etched dielectric material and electrically coupling second photosensitive pixel group 120Y. Subsequently, the metallic material is etched and pattern to form vertical rectangular electrodes 521, 523, and 525 and 527. Optionally, the previously etched dielectric material can be further etched to form dielectric pads 530.

Figure 8:
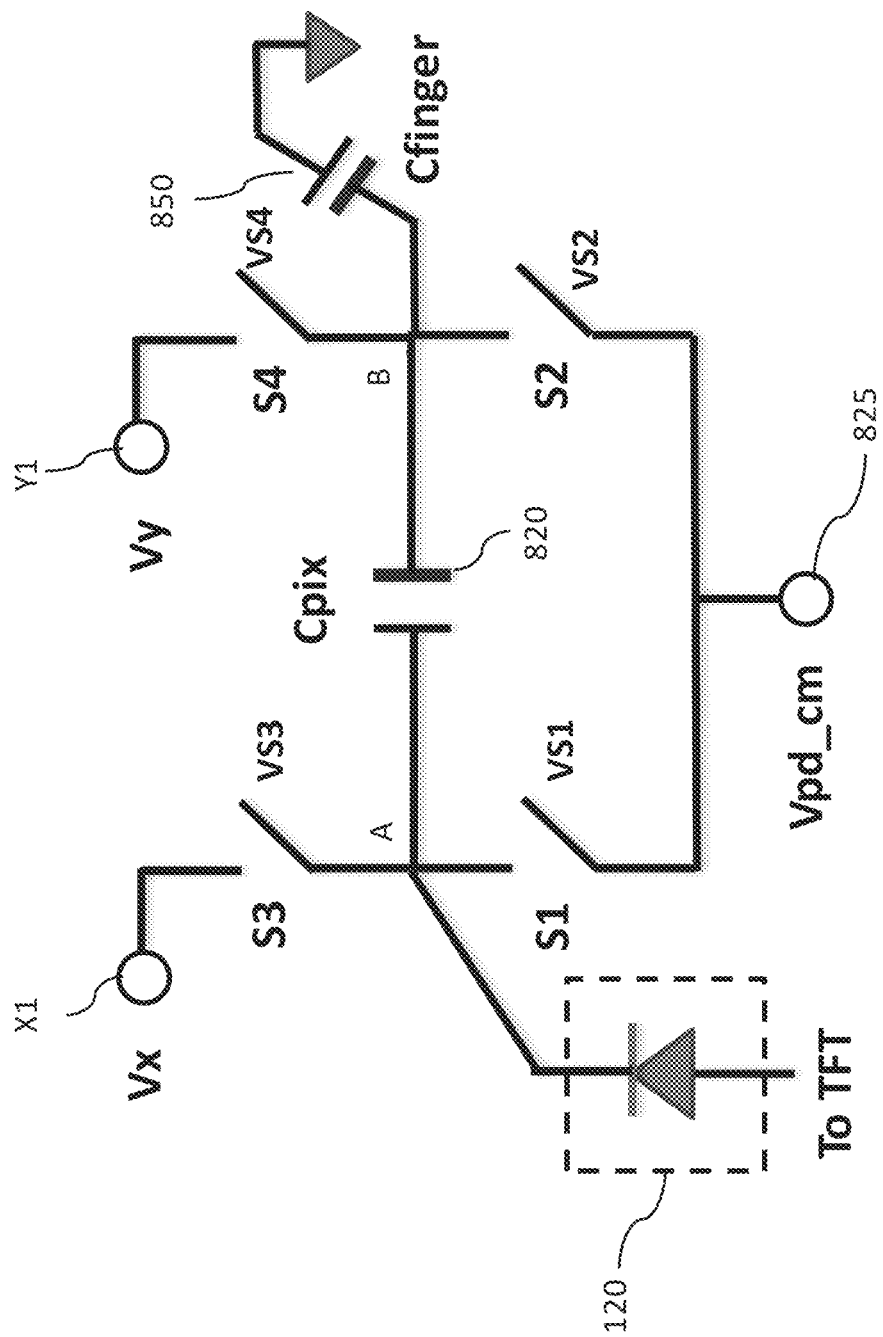
FIG. 8 illustrates a schematic circuit diagram for switching between an image sensor mode and a touch mode of an optical-capacitive sensor panel, in accordance with an embodiment of the present disclosure.

FIG. 8 illustrates a schematic circuit for switching between an image sensor mode and a touch mode of an optical-capacitive sensor panel 100, in accordance with an embodiment of the present disclosure. Referring to FIG. 8, a capacitor 820 represents a unit touch pixel corresponding to an effective capacitive touch pixel 250 as shown in FIG. 4A. It is appreciated that the schematic circuit may be similarly applied to an effective touch sensor pixel 520 as shown in FIG. 5.

Referring to FIG. 8, capacitor 820 may have a capacitance value of Cpix. Two terminals of capacitor 820 are electrically coupled or decoupled to a common node 825 through first and second switches S1 and S2, respectively. Common node 825 receives a common node signal Vpd_cm, which is a DC voltage (either GND or a supply voltage). First and second switches S1 and S2 can be operated together to short capacitor 820 to common node 825. In one embodiment, first and second switches S1 and S2 can be PMOS, NMOS, or CMOS transistor switches included in a driver integrated circuit (IC) electrically coupled to the sensor panel 100. Further, first and second switches S1 and S2 can be controlled respectively by control voltages VS1 and VS2 to turn ON or OFF.

In addition, one terminal of capacitor 820 is electrically coupled or decoupled to first electrode group X1 through node A to receive a column touch scan signal Vx through a third switch S3, while the other terminal of capacitor 820 is electrically coupled or decoupled to second electrode group Y1 through node B to receive a row touch scan signal Vy through a fourth switch S4. In certain embodiments, column touch scan signal Vx and row touch scan signal Vy can be either a DC signal or an AC signal. Third and fourth switches S3 and S4 can be operated together to connect capacitor 820 to first and second electrode groups X1 and Y1, thereby creating a potential difference (Vx–Vy) across capacitor 820. In one embodiment, third and fourth switches S3 and S4 can be PMOS, NMOS, or CMOS transistor switches included in a driver IC electrically coupled to the sensor panel 100. Further, third and fourth switches S3 and S4 can be controlled respectively by control voltages VS3 and VS4 to turn ON or OFF. One or more photosensitive pixels 120 can be electrically coupled to first electrode group X1 through node A. When a conductive object, e.g., a human finger, is in contact with a location on sensor panel 100 or 500, a touch capacitor 850 having a touch capacitance Cfinger is effectively formed and electrically coupled to one terminal of capacitor 820 through node B (i.e., capacitor 850 being effectively coupled between node B and GND).

Optical-capacitive sensor panel 100 or 500 of the present disclosure can be operated under (1) image sensor mode and (2) capacitive touch mode.

Image Sensor Mode

In the image sensor mode, first and second switches S1 and S2 are turned ON using control voltages VS1 and VS2, such that the voltage or potential difference across capacitor 820 is zero. In addition, third and fourth switches S3 and S4 are turned OFF using control voltages VS3 and VS4, so as to disconnect first and second electrode groups X1 and Y1 from capacitor 820. As a result, first and second electrode groups X1 and Y1 operate together to serve as a common electrode for all of photosensitive pixels 120.

In one embodiment, common node signal Vpd_cm can be a DC voltage (either a ground voltage or a supply voltage), depending on connection of photosensitive pixels 120 to the TFT circuit as a current source or a current sink. If first and second switches S1 and S2 are NMOS switches, control voltages VS1 and VS2 need to be at HIGH voltage to turn them ON. If first and second switches S1 and S2 are PMOS switches, control voltages VS1 and VS2 need to be at LOW voltage to turn them ON. It is appreciated that the switch types depend on voltage of common node signal Vpd_cm. If common node signal Vpd_cm is GND, first and second switches S1 and S2 should be NMOS devices and control voltages VS1 and VS2 need to be a HIGH voltage. On the other hand, common node signal Vpd_cm is a supply voltage, first and second switches S1 and S2 should be PMOS devices and control voltages VS1 and VS2 need to be a LOW voltage.

Capacitive Touch Mode

In the capacitive touch mode, first and second switches S1 and S2 are turned OFF, while third and fourth switches S3 and S4 are turned ON, so as to apply a voltage or potential difference, i.e., Vx−Vy, to capacitor 820. In addition, the control circuit (e.g., TFTs) for photosensitive pixels 120 is also turned OFF. When a conductive object, e.g., a human finger, touches upon sensor panel 100 at or around capacitor 820, an effective touch capacitor 850 having a touch capacitance Cfinger is formed and electrically coupled to one terminal of capacitor 820. As a result, touch capacitance Cfinger is added to capacitance Cpix and cause voltage and/or current glitches. Therefore, existence and absence of touch capacitor 850 (or conductive object) can be detected to achieve capacitive touch control. In one embodiment, voltages Vx and Vy are chosen to be always below the breakdown voltage of photosensitive pixels 120, such that when viewed from the X and Y electrodes, photosensitive pixels 120 are at a high resistance state and thus function as an electrical insulator.

In one embodiment, in the capacitive touch mode, sensor panel 100 can be used to achieve multi-point touch control. For example, sensor panel 100 may include an array of mutual capacitive touch pixels (e.g., 6 columns by 6 rows). By sequentially transmitting scan signals to row electrodes and then read each column when a specific row is scanned, multiple touches can be located by sensing voltage or current changes at multiple locations that correspond to specific rows and columns.

Figure 9:
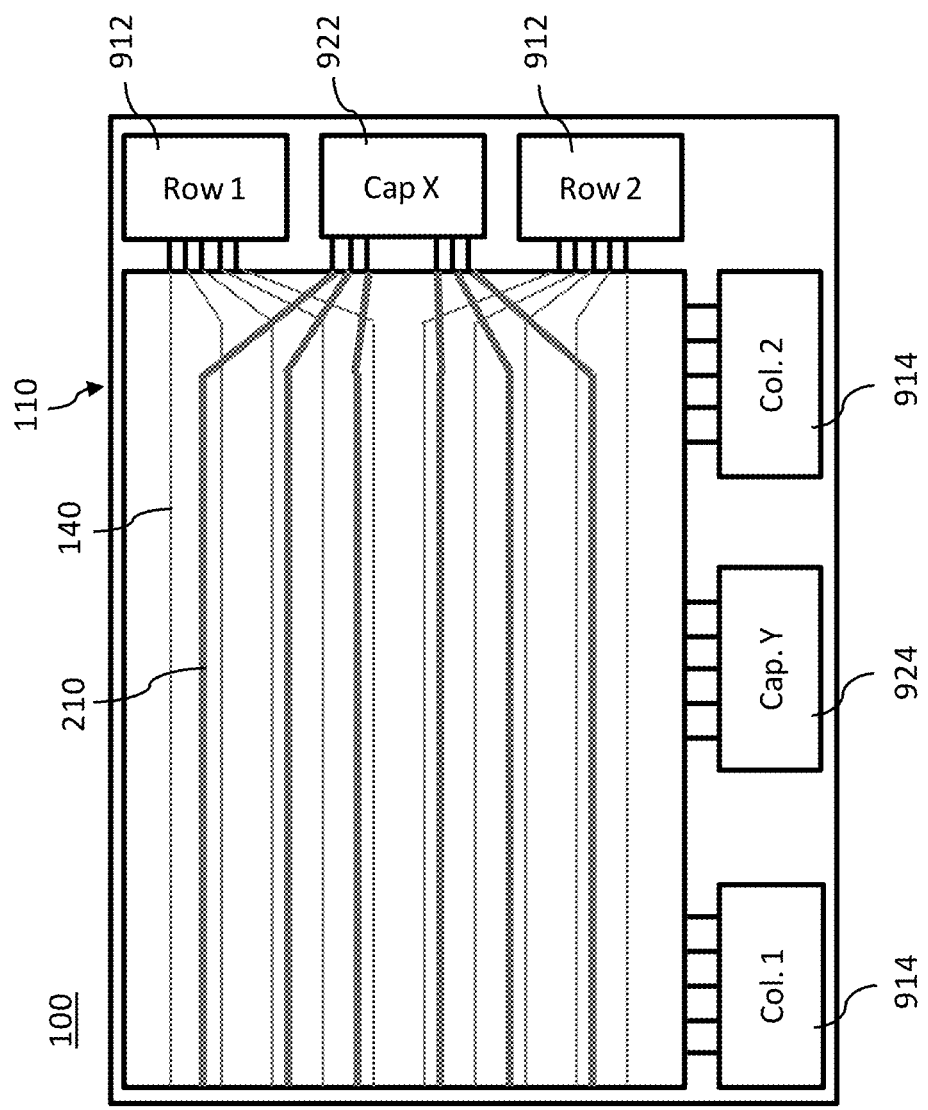
FIG. 9 illustrates an optical-capacitive sensor panel electrically coupled with multiple driver integrated circuits (ICs), in accordance with an embodiment of the present disclosure.

FIG. 9 illustrates an optical-capacitive sensor panel 100 electrically coupled with multiple driver integrated circuits 912, 922, 914, and 924, in accordance with an embodiment of the present disclosure. As discussed above, columns 130 and rows 140 are electrically coupled to photosensitive pixels 120 which are formed on a lower level of the sensor circuitry. In contrast, X and Y electrodes 210 and 220 that constitute capacitive touch pixels 250 are formed on an upper level of the sensor circuitry. That is, the lower level of sensor circuitry is formed directly on transparent substrate 110 and the upper level of sensor circuitry is formed over the lower level of sensor circuitry. The upper level of sensor circuitry is substantially insulated from the lower level of sensor circuitry by an insulating layer, except that photosensitive pixels 120 may be electrically coupled to X and/or Y electrodes 210 and/or 220 through via holes in the insulating layer.

Referring to FIG. 9, rows 140 are formed on the lower level of sensor circuitry and may be routed to electrically couple with multiple driver ICs. In this embodiment, one half of rows 140 is routed to electrically couple with first row driver IC 912, while the other half of portion of rows 140 are routed to electrically couple with second row driver IC 914. It is appreciated that, depending on design choices, rows 140 can be divided into any suitable number of groups, each being electrically coupled to a corresponding row driver IC.

Referring again to FIG. 9, X electrodes 210 are formed on the upper level of sensor circuitry and may be routed to electrically couple with an X touch driver IC 932. Although only a single driver IC 932 is shown and described for X electrodes 210, it is appreciated that a plurality of capacitive touch driver ICs may be used to achieve the capacitive touch function.

Likewise, columns 130 (not shown in FIG. 9) are formed on the lower level of sensor circuitry, one half of which may be routed to electrically couple with a first column driver IC 922 and the other half of which may be routed to electrically couple with second column driver IC 924. It is appreciated that, depending on design choices, columns 140 can be divided into any suitable number of groups, each being electrically coupled to a corresponding column driver IC. Further, Y electrodes 220 (not shown in FIG. 9) are formed on the upper level of sensor circuitry, which may be routed to electrically couple with a Y touch driver IC 934. Although only a single driver IC 934 is shown and described for Y electrodes 220, it is appreciated that a plurality of capacitive touch driver ICs may be used to achieve the capacitive touch function.

As shown in FIG. 9, driver ICs 912, 914, and 932 are disposed and attached on transparent substrate 110 at a first side proximate an edge of transparent substrate 110. In this embodiment, capacitive (X electrode) driver IC 932 is disposed between two image (row) driver ICs 912 and 914. Further, driver ICs 911, 924, and 934 are disposed and attached on transparent substrate 110 at a second side proximate another edge of transparent substrate 110. In this embodiment, capacitive (Y electrode) driver IC 934 is disposed between two image (column) driver ICs 922 and 924.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical values appeared in this specification are deemed modified by a term of degree thereby reflecting their intrinsic uncertainty.

Although various embodiments of the present disclosure have been described in detailed herein, one of ordinary skill in the art would readily appreciate modifications and other embodiments without departing from the spirit and scope of the present disclosure.

What is claimed is:

1. A sensor panel device, comprising:
   a transparent substrate;
   an optical sensor array disposed on the transparent substrate, the optical sensor array including a plurality of photosensitive pixels and a common electrode electrically coupled to the photosensitive pixels; and
   a capacitive sensor disposed on the transparent substrate and electrically coupled directly to the common electrode of the optical sensor array.

2. The device of claim 1, wherein the photosensitive pixels are spaced apart from each other and arranged on the transparent substrate to form a lattice structure.

3. The device of claim 2, wherein the lattice structure is an upright square lattice structure.

4. The device of claim 1, wherein the capacitive sensor comprises first and second electrodes, and an insulating layer between the first and second electrodes.

5. The device of claim 4, wherein one of the first and second electrodes is electrically connected to the common electrode, and another one of the first and second electrodes is electrically connected to a readout circuit.

6. The device of claim 1, wherein the capacitive sensor comprises a plurality of row electrodes, a plurality of column electrodes, and an insulating layer between each of the row and column electrodes.

7. The device of claim 6, wherein one of the row and column electrodes is formed on the optical sensor array and electrically coupled to the photosensitive pixels, and wherein another one of the row and column electrodes is formed on the insulating layer, crossing said one of the row and column electrodes.

8. The device of claim 7, wherein a plurality of sensing capacitors is formed at crossings of the row electrodes and the column electrodes.

9. The device of claim 6, wherein one of the row electrodes and the column electrodes is formed on the optical sensor array and electrically connected to a first group of the photosensitive pixels, and wherein another one of the row electrodes and the column electrodes is formed on the optical sensor array crossing the row electrodes and electrically connected to a second group of the photosensitive pixels.

10. The device of claim 9, wherein a plurality of sensing capacitors is formed at crossings of the row electrodes and the column electrodes.

11. The device of claim 6, wherein the row electrodes are configured to form a plurality of first neighboring electrode groups, each electrode within one of the first neighboring electrode groups being electrically connected with each other, and wherein the column electrodes are configured to form a plurality of second neighboring electrode groups, each electrode within one of the second neighboring electrode groups being electrically connected with each other.

12. The device of claim 11, wherein a capacitive sensing pixel is formed at a crossing of one of the first neighboring electrode groups and one of the second neighboring electrode groups.

13. The device of claim 6, further comprising a mode switch circuit configured to electrically couple each of the row and column electrodes at a common voltage in an image sensor mode.

14. The device of claim 1, further comprising a light block element on between the transparent substrate and each of the photosensitive pixels.

15. The device of claim 14, further comprising a backlight module having a light emitting surface that provides a surface light source, the transparent substrate being disposed on the light emitting surface of the backlight module.

16. A method for manufacturing a sensor panel device, the method comprising:
    providing a transparent substrate;
    forming an optical sensor array on the transparent substrate, the optical sensor array including a plurality of photosensitive pixels and a common electrode electrically coupled to the photosensitive pixels; and
    forming a capacitive sensor on the transparent substrate, the capacitive sensor being electrically coupled directly to the common electrode of the optical sensor array.

17. A sensor panel device, comprising:
    a transparent substrate;
    an optical sensor array formed on the transparent substrate, the optical sensor array including a first plurality of photosensitive pixels and a second plurality of photosensitive pixels;
    a plurality of row and column electrodes formed on the transparent substrate, wherein the row electrodes are common electrodes for and directly coupled to said first plurality of photosensitive pixels, and wherein the column electrodes, crossing the row electrodes, are common electrodes for and directly coupled to said second plurality of photosensitive pixels; and
    an insulating layer formed between the row and column electrodes.

18. The device of claim 17, wherein a plurality of sensing capacitors is formed at crossings of the row electrodes and the column electrodes.

19. The device of claim 17, further comprising a light block element between the transparent substrate and each of the first and second plurality of photosensitive pixels.

20. The device of claim 19, further comprising a backlight module having a light emitting surface that provides a surface light source, the transparent substrate being disposed on the light emitting surface of the backlight module.

* * * * *